United States Patent
Hirukawa et al.

(10) Patent No.: US 11,322,145 B2
(45) Date of Patent: May 3, 2022

(54) VOICE PROCESSING DEVICE, MEETING SYSTEM, AND VOICE PROCESSING METHOD FOR PREVENTING UNINTENTIONAL EXECUTION OF COMMAND

(71) Applicant: SHARP KABUSHIKI KAISHA, Sakai (JP)

(72) Inventors: Keiko Hirukawa, Sakai (JP); Satoshi Terada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 214 days.

(21) Appl. No.: 16/802,149

(22) Filed: Feb. 26, 2020

(65) Prior Publication Data
US 2020/0286478 A1 Sep. 10, 2020

(30) Foreign Application Priority Data

Mar. 6, 2019 (JP) .............................. JP2019-040288

(51) Int. Cl.
*G10L 15/22* (2006.01)
*G10L 15/28* (2013.01)
*G10L 15/183* (2013.01)

(52) U.S. Cl.
CPC ............ *G10L 15/22* (2013.01); *G10L 15/183* (2013.01); *G10L 15/28* (2013.01)

(58) Field of Classification Search
CPC ........... G10L 15/22; H04N 7/147; H04N 7/15
See application file for complete search history.

(56) References Cited

U.S. PATENT DOCUMENTS

| | | | | |
|---|---|---|---|---|
| 10,388,325 | B1* | 8/2019 | Badash | H04N 9/802 |
| 2011/0285807 | A1* | 11/2011 | Feng | H04N 5/23299 348/14.08 |
| 2014/0142950 | A1* | 5/2014 | Crawley | G10L 15/22 704/275 |
| 2015/0088514 | A1* | 3/2015 | Typrin | G06F 3/167 704/249 |
| 2016/0173821 | A1* | 6/2016 | De Magalhaes | G06K 9/00718 348/14.08 |
| 2019/0341050 | A1* | 11/2019 | Diamant | H04N 7/155 |

FOREIGN PATENT DOCUMENTS

JP 2010-055375 A 3/2010

\* cited by examiner

*Primary Examiner* — Jialong He
(74) *Attorney, Agent, or Firm* — ScienBiziP, P.C.

(57) ABSTRACT

A voice processing device includes a voice receiver that receives a voice, an imager, an image acquirer that acquires a captured image captured by the imager, an utterer identifier that identifies an utterer based on the voice received by the voice receiver and the captured image acquired by the image acquirer, a voice determiner that determines whether the voice is a specific word based on the voice received by the voice receiver and an image of the utterer identified by the utterer identifier, the image being included in the captured image, and a voice transmitter that switches a transmission destination of the voice received by the voice receiver based on a determination result by the voice determiner.

9 Claims, 5 Drawing Sheets

FIG. 3

USER INFORMATION D1

| USER ID | IMAGE DATA |
|---|---|
| U001 | P1 |
| U002 | P2 |
| U003 | P3 |
| U004 | P4 |

VOICE PROCESSING DEVICE, MEETING SYSTEM, AND VOICE PROCESSING METHOD FOR PREVENTING UNINTENTIONAL EXECUTION OF COMMAND

INCORPORATION BY REFERENCE

This application is based upon and claims the benefit of priority from the corresponding Japanese Patent Application No. 2019-040288 filed on Mar. 6, 2019, the entire contents of which are incorporated herein by reference.

The present disclosure relates to a voice processing device, a meeting system, and a voice processing method.

BACKGROUND

There is proposed a voice processing device for recognizing a voice of a user and executing information processing in accordance with the voice. For example, if the user wants to know the current weather, the user utters a preset specific word set in advance toward the voice processing device. If receiving the specific word, the voice processing device starts receiving a command corresponding to information processing. Thereafter, if the user utters a question (command voice) such as "tell me the weather", the voice processing device receives the command voice to execute the command. For example, the voice processing device acquires weather information thorough the Internet, and outputs a voice in response to the question.

In such a conventional voice processing device, if a plurality of users utter the specific word in a usual conversation, the voice processing device detects the specific word and enters a standby state in which command reception is started. In this case, there are problems in that notifying the outside that the voice processing device enters the standby state interferes with a conversation of a user, or the user needs to cancel the standby state. Further, if the user continues the conversation without being aware of the standby state of the voice processing device, there is a problem in that the voice processing device recognizes a part of the user's conversation, as a command voice and then executes the command.

SUMMARY

An object of the present disclosure is to provide a voice processing device capable of preventing execution of a command not intended by a user without interfering with a conversation of the user, a meeting system therefor, and a voice processing method therefor.

A voice processing device according to an aspect of the present disclosure includes a voice receiver that receives a voice, an imager, an image acquirer that acquires a captured image captured by the imager, an utterer identifier that identifies an utterer based on the voice received by the voice receiver and the captured image acquired by the image acquirer, a voice determiner that determines whether the voice is a specific word for starting receiving a predetermined command based on the voice received by the voice receiver and an image of the utterer identified by the utterer identifier, the image of the utterer being included in the captured image, and a voice transmitter that switches a transmission destination of the voice received by the voice receiver, based on a determination result by the voice determiner.

A meeting system according to another aspect of the present disclosure includes a first voice processing device and a second voice processing device that are connected to each other via a network so that a voice received by the first voice processing device is transmitted to the second voice processing device and a voice received by the second voice processing device is transmitted to the first voice processing device. The first voice processing device includes a voice receiver that receives a voice, an imager, an image acquirer that acquires a captured image captured by the imager, an utterer identifier that identifies an utterer based on the voice received by the voice receiver and the captured image acquired by the image acquirer, a voice determiner that determines whether the voice is a specific word for starting receiving a predetermined command based on the voice received by the voice receiver and an image of the utterer identified by the utterer identifier, the image of the utterer being included in the captured image, and a voice transmitter that switches a transmission destination of the voice received by the voice receiver based on a determination result by the voice determiner. If the voice determiner determines that the voice received by the voice receiver is the specific word, the voice transmitter transmits a voice received following the specific word by the voice receiver, as a command voice, to a server device that executes the predetermined command, and if the voice determiner determines that the voice received by the voice receiver is not the specific word, the voice transmitter transmits the voice to the second voice processing device.

A voice processing method according to yet another aspect of the present disclosure executes, by one or more processors, a voice reception process for receiving a voice, an image processing process for acquiring a captured image captured by an imager, an utterer identifying process for identifying an utterer based on the voice received at the voice reception process and the captured image acquired at the image processing process, a voice determination process for determining whether the voice is a specific word for starting receiving a predetermined command based on the voice received at the voice reception process and an image of the utterer identified at the utterer identifying process, the image of the utterer being included in the captured image, and a voice transmission process for switching a transmission destination of the voice received at the voice reception process based on a determination result at the voice determination process.

According to the present disclosure, provided are a voice processing device capable of preventing execution of a command not intended by a user without interfering with a conversation of the user, a meeting system therefor, and a voice processing method therefor.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a table showing an example of user information used in the meeting system according to the embodiment of the present disclosure;

DETAILED DESCRIPTION

Below, an embodiment of the present disclosure will be described with reference to the attached drawings. It is noted that the following embodiment is an example in which the present disclosure is embodied, and does not intend to limit the technical scope of the present disclosure.

A voice processing device according to the present disclosure is applicable to a meeting in which a plurality of users participate, a remote meeting in which a plurality of users in remote places connected via a network participate, and the like. The voice processing device may also be used by a single user. For example, the voice processing device may be installed in a general household and connected to a household device to execute various types of commands based on user instructions. Further, the voice processing device may have a function for executing a command and a call function for calling between users. In the following embodiment, a case where the voice processing device is applied to a remote meeting will be described as an example. That is, the voice processing device according to the present disclosure constitutes a meeting system according to the present disclosure. In the remote meeting, a voice processing device is installed in each of the remote places (meeting rooms), and a voice processing device in a first meeting room receives a voice uttered by a user and transmits the voice to a voice processing device in a second meeting room, thereby enabling a conversation between the users in the meeting rooms. Further, in each of the meeting rooms, the voice processing device receives a command voice from the user and transmits the command voice to a cloud server that executes a predetermined command.

Figure 1:
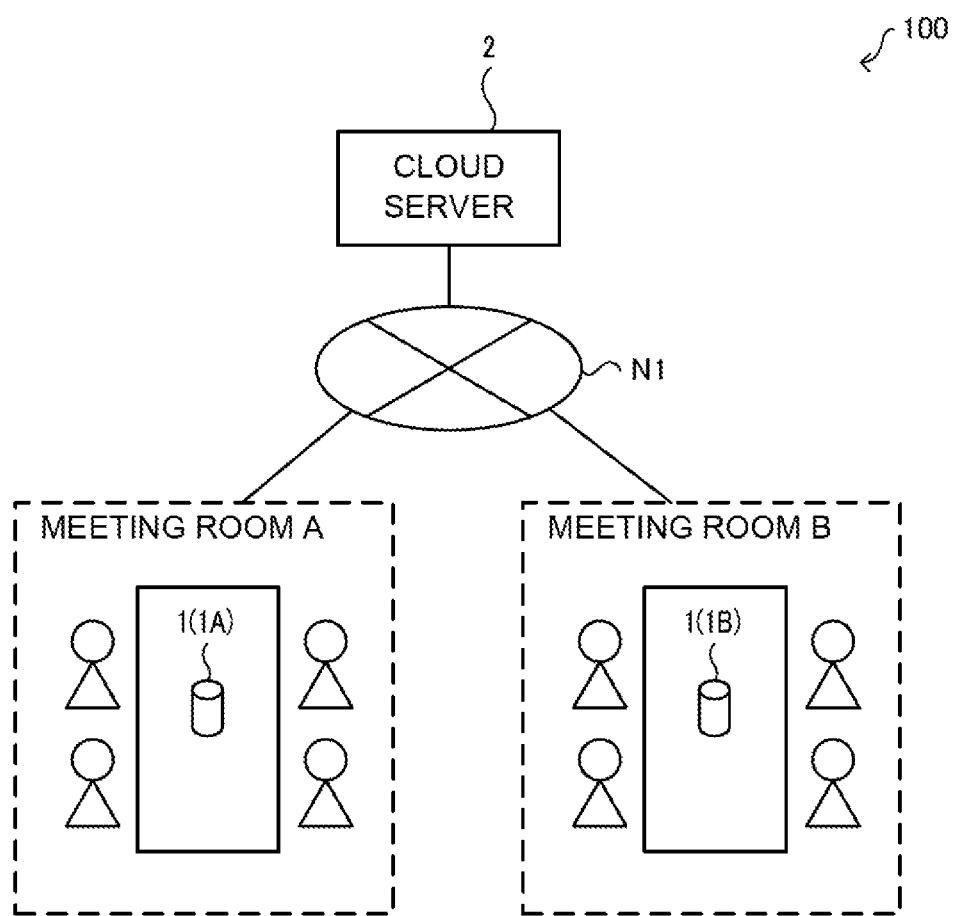
FIG. 1 is a diagram illustrating a simplified configuration of a meeting system according to an embodiment of the present disclosure.

FIG. 1 is a diagram illustrating a simplified configuration of a meeting system according to an embodiment of the present disclosure. A meeting system 100 includes one or more voice processing devices 1 and a cloud server 2. The voice processing devices 1A and 1B are each a microphone speaker device including a microphone and a speaker, such as an AI speaker or a smart speaker. Here, the voice processing device 1A installed in a meeting room A and the voice processing device 1B installed in a meeting room B are illustrated. The voice processing device 1A, the voice processing device 1B, and the cloud server 2 are connected to each other via a network N1. The network N1 is a communication network such as the Internet, LAN, WAN, or public telephone line. The cloud server 2 is composed of, for example, a plurality of data servers (virtual servers). The voice processing devices 1A and 1B are each an example of a voice processing device of the present disclosure. Further, the voice processing device 1A is an example of a first voice processing device of the present disclosure, and the voice processing device 1B is an example of a second voice processing device of the present disclosure. The cloud server 2 is an example of a server device of the present disclosure.

Hereinafter, a specific configuration of the meeting system 100 will be described. It is noted that, in the following description, the voice processing devices 1A and 1B are referred to as the voice processing device 1 when these are not distinguished. Further, the cloud server 2 will be described as a single virtual server. It is noted that the cloud server 2 may be replaced with a single physical server.

Voice Processing Device 1

Figure 2:
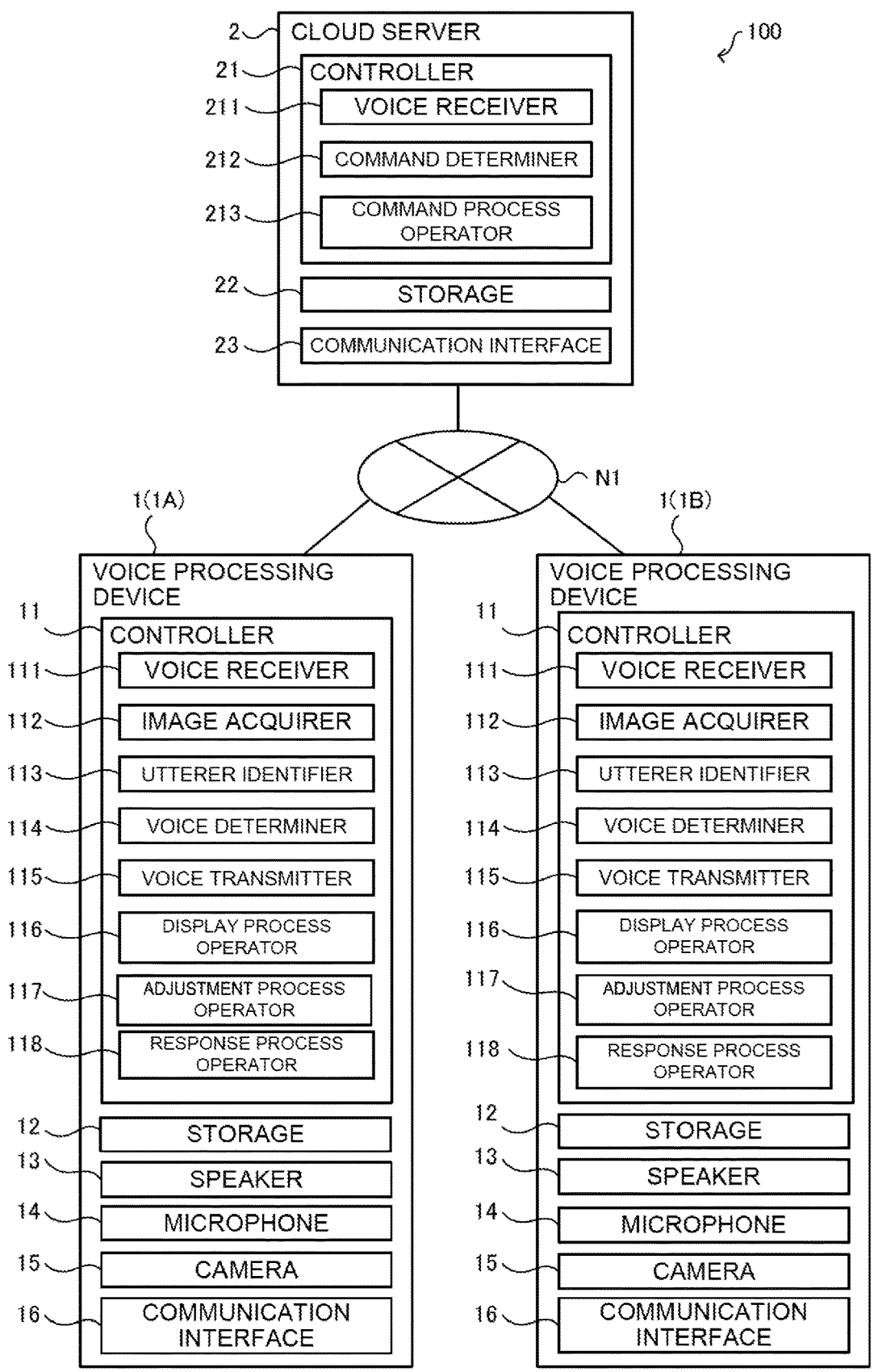
FIG. 2 is a functional block diagram illustrating a configuration of the meeting system according to the embodiment of the present disclosure.

As illustrated in FIG. 2, the voice processing device 1 includes a controller 11, a storage 12, a speaker 13, a microphone 14, a camera 15, a communication interface 16, and the like. The voice processing device 1 may be a device such as an AI speaker or a smart speaker. The voice processing device 1 is placed, for example, near the center of a desk in a meeting room, acquires a voice of a user who participates in a meeting via the microphone 14 and outputs (notifies) a voice from the speaker 13 to the user.

The camera 15 is a digital camera that captures an image of a subject and outputs the image as digital image data. For example, the camera 15 is provided on the upper surface of the voice processing device 1, and captures an image in a range of 360 degrees around the voice processing device 1. Here, the camera 15 captures an image of the entire interior of the meeting room. The camera 15 is an example of an imager according to the present disclosure.

The communication interface 16 connects the voice processing device 1 to the network N1 by wire or wirelessly, and is a communication interface for performing data communication following a predetermined communication protocol, with other devices (e.g., the voice processing device 1 and the cloud server 2) via the network N1.

The storage 12 is a non-volatile storage such as a flash memory that stores various types of information.

Specifically, the storage 12 stores data such as information (user information D1) of a user who uses the voice processing device 1. FIG. 3 is a table showing an example of the user information D1. In the user information D1, a user ID and image data are registered in association with each other for each user. The user ID is identification information of a user. The image data is image data of a captured image obtained by capturing a user. The captured image includes a face image of the user. The example shown in FIG. 3 indicates user information D1 stored in the storage 12 of the voice processing device 1A installed in the meeting room A. In the user information D1, user information for four users in the meeting room A is registered (see FIG. 1). It is noted that, when a user enters the meeting room A, an ID card or the like may be held over a device such as the voice processing device 1A, so that the user ID and image data of the user may be registered in the user information D1 in the storage 12 from a data server (not illustrated) in which a plurality of pieces of user information are registered in advance.

In addition, the storage 12 stores a control program such as voice processing program for causing the controller 11 to execute voice processing (see FIG. 4) described later. For example, the voice processing program is distributed from the cloud server 2 and stored. The voice processing program may also be recorded non-temporarily on a computer-readable recording medium such as a CD or a DVD, and may be read by a reading device (not illustrated) such as a CD drive or a DVD drive mounted in the voice processing device 1 and be stored in the storage 12.

The controller 11 includes a control device such as a CPU, a ROM, and a RAM. The CPU is a processor that executes various types of arithmetic processes. The ROM stores in advance a control program such as BIOS and OS for causing the CPU to execute various types of processes. The RAM stores various information and is used as a temporary storage memory (working area) for various processes to be executed by the CPU. Then, the controller 11 controls the voice processing device 1 by causing the CPU to execute various types of control programs stored in advance in the ROM or the storage 12.

Specifically, the controller 11 includes various types of process operators including a voice receiver 111, an image acquirer 112, an utterer identifier 113, a voice determiner 114, a voice transmitter 115, a display process operator 116, an adjustment process operator 117, and a response process operator 118. It is noted that the controller 11 functions as the various types of process operators by causing the CPU to execute various types of processes according to the control programs. Moreover, some or all of the process operators included in the controller 11 may include an electronic circuit. It is noted that the voice processing program may be a program for causing a plurality of processors to function as the various types of process operators.

The voice receiver 111 receives a voice uttered by a user who uses the voice processing device 1. The voice receiver 111 is an example of a voice receiver of the present disclosure. The user utters, for example, a voice regarding a meeting, a voice of a specific word (also referred to as an activation word or a wake-up word) for the voice processing device 1 to start receiving a command, a voice of various commands for instructing the voice processing device 1 (command voice), and the like. The voice receiver 111 receives various types of voices uttered by the user.

The image acquirer 112 acquires a captured image captured by the camera 15. The image acquirer 112 is an example of an image acquirer of the present disclosure. For example, if four users in the meeting room A are captured by the camera 15, the image acquirer 112 acquires a captured image including the four users.

The utterer identifier 113 identifies a user (utterer) who has uttered based on the voice received by the voice receiver 111 and the captured image acquired by the image acquirer 112. The utterer identifier 113 is an example of an utterer identifier of the present disclosure. For example, the utterer identifier 113 identifies a direction (utterer direction) in which the voice is received based on a direction in which the microphone 14 collects a sound, and identifies an utterer based on the captured image included in the direction. For example, if a user is included in the captured image included in that direction, the utterer identifier 113 identifies the user as the utterer.

Here, if at least one user is included in the captured image included in the direction in which the voice receiver 111 receives the voice, the utterer identifier 113 may identify the utterer by the following method.

As a first method, the utterer identifier 113 extracts one user as an utterer candidate from the captured image. The utterer identifier 113 determines whether or not the extracted user is within a predetermined range. If the extracted user is within the predetermined range, the utterer identifier 113 identifies the user as an utterer. For example, the predetermined range is set to a range of a few meters in radius about the voice processing device 1. Thus, it is possible to prevent a user who is away from the voice processing device 1 from being identified as the utterer.

As a second method, the utterer identifier 113 determines whether or not the extracted user is facing the front, that is, whether or not the direction of the user's face or the line of sight of the user is directed to the camera 15. If the user is facing the front, the utterer identifier 113 identifies the user as an utterer. Thus, it is possible to prevent a user who is facing and speaking in a direction different from the front from being identified as the utterer.

As a third method, the utterer identifier 113 determines whether or not the extracted user is registered in the user information D1. If the user is registered in the user information D1, the utterer identifier 113 identifies the user as an utterer. Thus, it is possible to prevent a user who is speaking but not registered in the user information D1 from being identified as the utterer.

As a fourth method, the utterer identifier 113 determines whether or not a movement of the mouth of the extracted user matches a timing at which the voice receiver 111 receives the voice. If the movement of the mouth matches the timing of the reception, the utterer identifier 113 identifies the user as an utterer. Thus, it is possible to prevent a user whose mouth movement does not match the timing of the reception from being identified as the utterer.

The utterer identifier 113 identifies an utterer using at least one of the first method to the fourth method. Further, the utterer identifier 113 may identify an utterer by combining two or three of the first method to the fourth method, or may identify an utterer using all the methods.

Here, if a first user extracted arbitrarily from among a plurality of users included in the captured image included in the direction in which the voice receiver 111 receives the voice is not identified as an utterer by any of the first method to the fourth method, the utterer identifier 113 extracts a second user being another user, and determines whether the extracted second user is the utterer using at least one of the first method to the fourth method. Thus, the utterer identifier 113 performs the determination process for each of the plurality of users until the utterer is identified.

It is noted that, if the meeting system 100 is configured to output a voice uttered by a user in a remote place (meeting room B) from a speaker device (not illustrated) which is installed in the meeting room A and is different from the voice processing device 1A, a captured image included in the direction in which the voice receiver 111 of the voice processing device 1A receives the voice does not include the user but includes the speaker device. In this case, the utterer identifier 113 does not identify an utterer and determines that the voice is not of a user who is in the meeting room A.

The voice determiner 114 determines whether or not the voice is the specific word based on the voice received by the voice receiver 111 and the image of the utterer which is identified by the utterer identifier 113 and is included in the captured image. The voice determiner 114 is an example of a voice determiner of the present disclosure. For example, the voice determiner 114 determines whether or not the voice received by the voice receiver 111 matches the specific word. The voice determiner 114 determines whether or not the utterer included in the captured image is facing the front, that is, whether or not the direction of the utterer's face or the line of sight of the utterer is directed to the camera 15. Then, if the voice received by the voice receiver 111 matches the specific word and the direction of a face of the utterer or the line of sight of the utterer included in the captured image is directed to the camera 15, the voice determiner 114 determines that the voice received by the voice receiver 111 is the specific word. On the other hand, if the voice received by the voice receiver 111 does not match the specific word or if the direction of a face of the utterer or the line of sight of the utterer included in the captured image is not directed to the camera 15, the voice determiner 114 determines that the voice received by the voice receiver 111 is not the specific word.

The voice transmitter 115 switches the transmission destination of the voice received from the voice receiver 111 based on the determination result by the voice determiner 114. The voice transmitter 115 is an example of a voice transmitter of the present disclosure. Specifically, if the voice determiner 114 determines that the voice received by the voice receiver 111 is the specific word, the voice transmitter 115 transmits a voice received following the specific word by the voice receiver 111, as a command voice, only to the cloud server 2. If the voice determiner 114 determines that the voice received by the voice receiver 111 is not the specific word, the voice transmitter 115 transmits the voice to another voice processing device 1. For example, the voice transmitter 115 of the voice processing device 1A transmits the voice that is not the specific word to the voice processing device 1B. The voice processing device 1B is an example of an external device of the present disclosure.

Here, the voice transmitter 115 may be configured to switch between a command transmission mode (corresponding to a first transmission mode of the present disclosure) and a voice transmission mode (corresponding to a second transmission mode of the present disclosure) based on the determination result by the voice determiner 114. The command transmission mode is to transmit the voice received by the voice receiver 111 to the cloud server 2. The voice transmission mode is to transmit the voice received by the voice receiver 111 to another voice processing device 1. For example, if the voice determiner 114 determines that the voice received by the voice receiver 111 is the specific word, the voice transmitter 115 sets (switches) the transmission mode to the command transmission mode. If the transmission mode is set to the command transmission mode, the voice transmitter 115 transmits the command voice to the cloud server 2. After transmitting the command voice to the cloud server 2, the voice transmitter 115 sets (switches) the transmission mode to the voice transmission mode. If the transmission mode is set to the voice transmission mode, the voice transmitter 115 transmits the voice received by the voice receiver 111 to another voice processing device 1.

The display process operator 116 causes to display identification information indicating the transmission mode. The display process operator 116 is an example of a display process operator of the present disclosure. For example, the display process operator 116 causes a red LED to emit light if the transmission mode is the command transmission mode, and causes a blue LED to emit light if the transmission mode is the voice transmission mode. It is noted that the identification information indicating the transmission mode may be text information or sound information. If the voice processing device 1 includes a display, the display process operator 116 may cause to display the text information on the display.

The adjustment process operator 117 adjusts the directivity of the microphone 14 that collects sound. The adjustment process operator 117 is an example of an adjustment process operator of the present disclosure. Specifically, when the voice transmitter 115 sets the voice transmission mode to the command transmission mode, the adjustment process operator 117 adjusts the directivity of the microphone 14 into the direction of the utterer identified by the utterer identifier 113. This makes it possible for the voice receiver 111 to reliably acquire the command voice uttered by the utterer.

The response process operator 118 acquires a response (command response) corresponding to the command executed in the cloud server 2 from the cloud server 2, and causes the speaker 13 to output the command response. It is noted that, if the voice processing device 1 includes a display, the response process operator 118 may display the command response on the display. The response process operator 118 is an example of a response process operator of the present disclosure.

Cloud Server 2

As illustrated in FIG. 2, the cloud server 2 includes a controller 21, a storage 22, a communication interface 23, and the like.

The communication interface 23 connects the cloud server 2 to the network N1 by wire or wirelessly, and is a communication interface for performing data communication following a predetermined communication protocol, with other devices (e.g., the voice processing devices 1A and 1B) via the network N1.

The storage 22 is a non-volatile storage such as a flash memory that stores various types of information. For example, the storage 22 stores a control program executed by the controller 21. The storage 22 also stores command information corresponding to voice data (a command voice) received from the voice processing device 1.

The controller 21 includes control devices such as a CPU, a ROM, and a RAM. The CPU is a processor that executes various types of arithmetic processes. The ROM stores in advance a control program such as BIOS and OS for causing the CPU to execute various types of processes. The RAM stores various information and is used as a temporary storage memory (working area) for various processes to be executed by the CPU. The controller 21 controls the cloud server 2 by causing the CPU to execute various types of control programs stored in advance in the ROM or the storage 22.

Specifically, the controller 21 includes various types of process operators such as a voice receiver 211, a command determiner 212, and a command process operator 213. It is noted that the controller 21 functions as the various types of process operators by causing the CPU to execute various types of processes according to the control programs. Moreover, some or all of the process operators included in the controller 21 may include an electronic circuit. It is noted that the control programs may be programs for causing a plurality of processors to function as the various types of process operators.

The voice receiver 211 receives a command voice transmitted from the voice processing device 1. Specifically, if the voice processing device 1 acquires the command voice after entering a standby state (command transmission mode) in which command reception is started in response to detecting the specific word, and then transmits the command voice to the cloud server 2, the cloud server 2 receives the command voice. That is, voice data is not transmitted to the cloud server 2 when the voice processing device 1 is in a sleep state (voice transmission mode) before entering the standby state. This makes it possible to suppress unnecessary data communication.

The command determiner 212 determines a command based on the command voice received by the voice receiver 211. Specifically, the command determiner 212 performs voice recognition processing on the command voice received by the voice receiver 211, and converts the voice data into text data. Then, the command determiner 212 refers to the command information stored in the storage 22 to determine a command corresponding to the text data.

The command process operator 213 executes a process corresponding to the command determined by the command determiner 212. For example, if the command is a search command for searching for predetermined information, the command process operator 213 executes a search process. The command process operator 213 also transmits a response result (command response) to the command voice to the voice processing device 1 from which the command voice is transmitted. It is noted that the command process operator 213 may transmit a command response to a device different a device from which the command voice is transmitted. For example, if receiving the command voice from the voice processing device 1A in the meeting room A, the command process operator 213 may transmit the command response to a display device (not illustrated) installed in the meeting room A. In this case, information on the command response is displayed on the display device.

It is noted that, as another embodiment of the voice processing device 1, each voice processing device 1 may have the functions of the cloud server 2, that is, the functions of the command determiner 212 and the command process operator 213.

Voice Processing

Hereinafter, an example of a procedure of voice processing executed by the controller 11 of the voice processing device 1 will be described with reference to FIGS. 4 and 5. Here, in the meeting system 100 illustrated in FIG. 1, the voice processing will be described focusing on the voice processing device 1A. For example, the controller 11 of the voice processing device 1A starts execution of the voice processing program in response to receiving a voice of a user to start execution of the voice processing. It is noted that the voice processing is individually executed in parallel in each of the voice processing devices 1A and 1B.

It is noted that the present disclosure can be regarded as an invention of a voice processing method in which one or more steps included in the voice processing are executed. Further, one or more steps included in the voice processing described here may be omitted where appropriate. In addition, each of the steps in the voice processing may be executed in a different order as long as a similar operation and effect is obtained. Furthermore, although a case where each of the steps in the voice processing is executed by the controller 11 will be described as an example here, in another embodiment, each of the steps in the voice processing may be dispersedly executed by a plurality of processors.

In step S101, the controller 11 determines whether or not the voice processing device 1A has received the command response from the cloud server 2. If the voice processing device 1A receives the command response from the cloud server 2 (S101: YES), the processing proceeds to step S116. On the other hand, when the voice processing device 1A does not receive the command response from the cloud server 2 (S101: NO), the processing proceeds to step S102.

In step S102, the controller 11 determines whether or not a voice input is started via the microphone 14. For example, if a user in the meeting room A starts uttering and a voice input (8102: YES), the processing proceeds to step S103. if no voice input is started (S102: NO), the processing returns to step S101.

In step S103, the controller 11 determines whether or not the transmission mode is the command transmission mode. If the transmission mode is the command transmission mode (S103: YES), the processing proceeds to step S112. On the other hand, if the transmission mode is not the command transmission mode (8103: NO), the processing proceeds to step S104.

In step S104, the controller 11 acquires a captured image captured by the camera 15, and performs image recognition to recognize the user. Here, the controller 11 recognizes four users in the meeting room A (see FIG. 1) based on the captured image.

Next, in step S105, the controller 11 recognizes the input voice. For example, the controller 11 performs a voice recognition process for converting voice data into text data.

Next, in step S106, the controller 11 executes a voice determination process for determining whether or not the recognized voice is the specific word. FIG. 5 is a flowchart illustrating an example of a procedure of the voice determination process.

Figure 5:
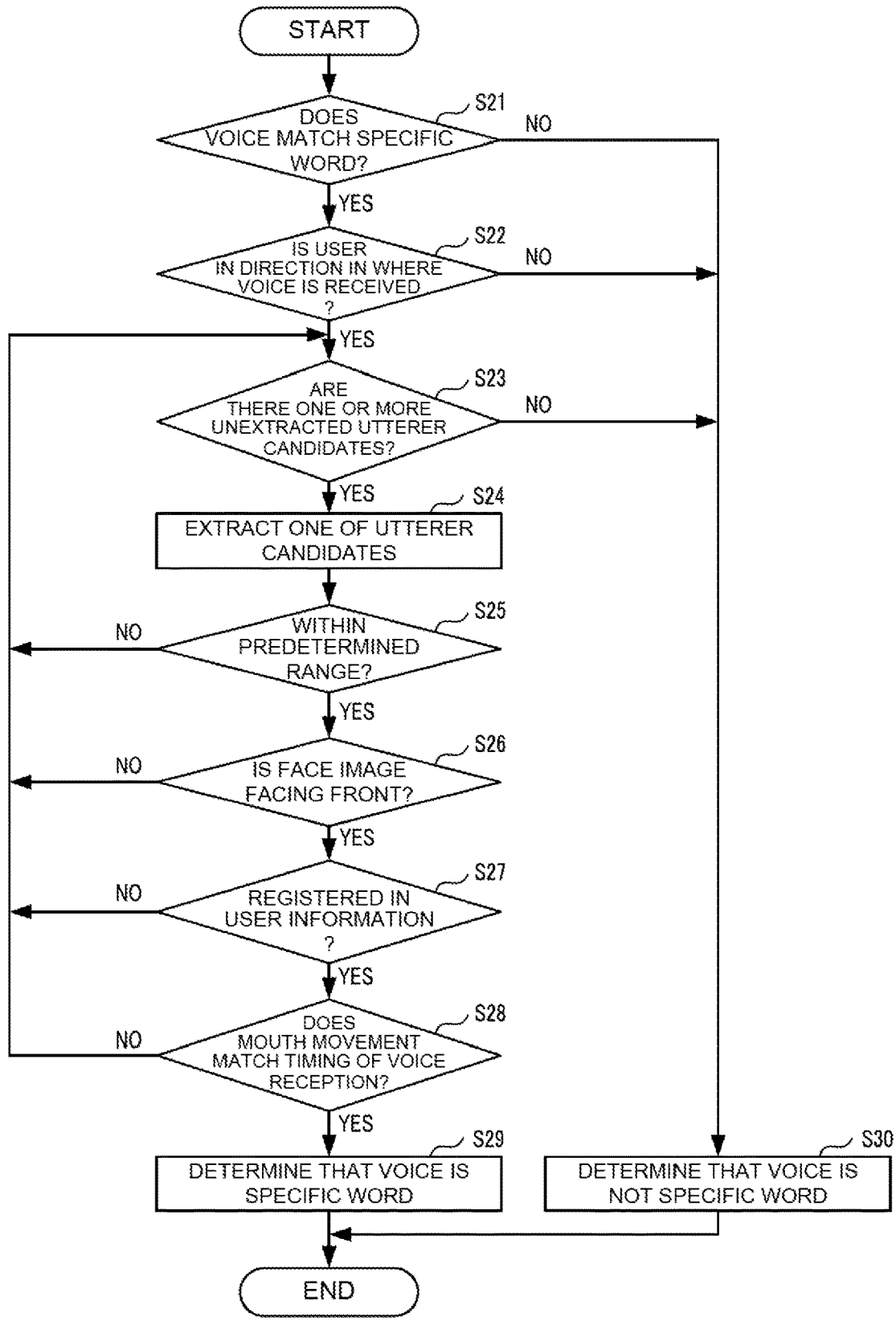
FIG. 5 is a flowchart for explaining an example of a procedure of a voice determination process in the voice processing device according to the embodiment of the present disclosure.

In step S21 illustrated in FIG. 5, the controller 11 determines whether or not the voice matches the specific word. For example, the controller 11 compares the text data of the voice with the specific word to determine whether or not these match. If the voice matches the specific word (821: YES), the processing proceeds to step S22. On the other hand, if the voice does not match the specific word (S21: NO), the processing proceeds to step S30.

In step S22, the controller 11 determines whether or not there is a user in the direction in which the voice is received, in the captured image. If there is a user in the direction in which the voice is received (S22: YES), the processing proceeds to step S23. On the other hand, if there is no user in the direction in which the voice is received (822: NO), the processing proceeds to step S30.

In step S23, the controller 11 determines whether or not there are one or more unextracted utterer candidates. If there is one or more unextracted utterer candidates (S23: YES), the processing proceeds to step S24. If there is not one or more unextracted utterer candidates (S23: NO), the processing proceeds to step S30.

In step S24, the controller 11 extracts any one user from the utterer candidates included in the captured image.

In step S25, the controller 11 determines whether or not the extracted user is within the predetermined range. Step S25 corresponds to the first method. If the extracted user is within the predetermined range (S25: YES), the processing proceeds to step S26. On the other hand, if the extracted user is not within the predetermined range (825: NO), the processing returns to step S23.

In step S26, the controller 11 determines whether or not the extracted user is facing the front, that is, whether or not the direction of the user's face or the line of sight of the user is directed to the camera 15. Step S26 corresponds to the second method. If the extracted user is facing the front (S26: YES), the processing proceeds to step S27. On the other hand, when the extracted user is not facing the front (S26: NO), the processing returns to step S23.

In step S27, the controller 11 determines whether or not the extracted user is registered in the user information D1 (see FIG. 3). Step S27 corresponds to the third method. If the extracted user is registered in the user information D1 (S27: YES), the processing proceeds to step S28. On the other hand, if the extracted user is not registered in the user information D1 (S27: NO), the processing returns to step S23.

In step S28, the controller 11 determines whether or not the movement of the mouth of the extracted user matches a timing at which the voice is received. Step S28 corresponds to the fourth method. If the movement of the mouth of the extracted user matches the timing at which the voice is received (S28: YES), the processing proceeds to step S29. On the other hand, if the movement of the mouth of the extracted user does not match the timing at which the voice is received (S28: NO), the processing returns to step S23.

In step S29, the controller 11 identifies the user as an utterer, and determines that the voice is the specific word. On the other hand, in step S30, the controller 11 determines that the voice is not the specific word. The controller 11 performs the voice determination process as described above. In the above-described processing, the voice determination process is performed using all of the first method to the fourth method. However, the present disclosure is not limited to this, and the voice determination process may be performed using at least one of the first method to the fourth method.

Figure 4:
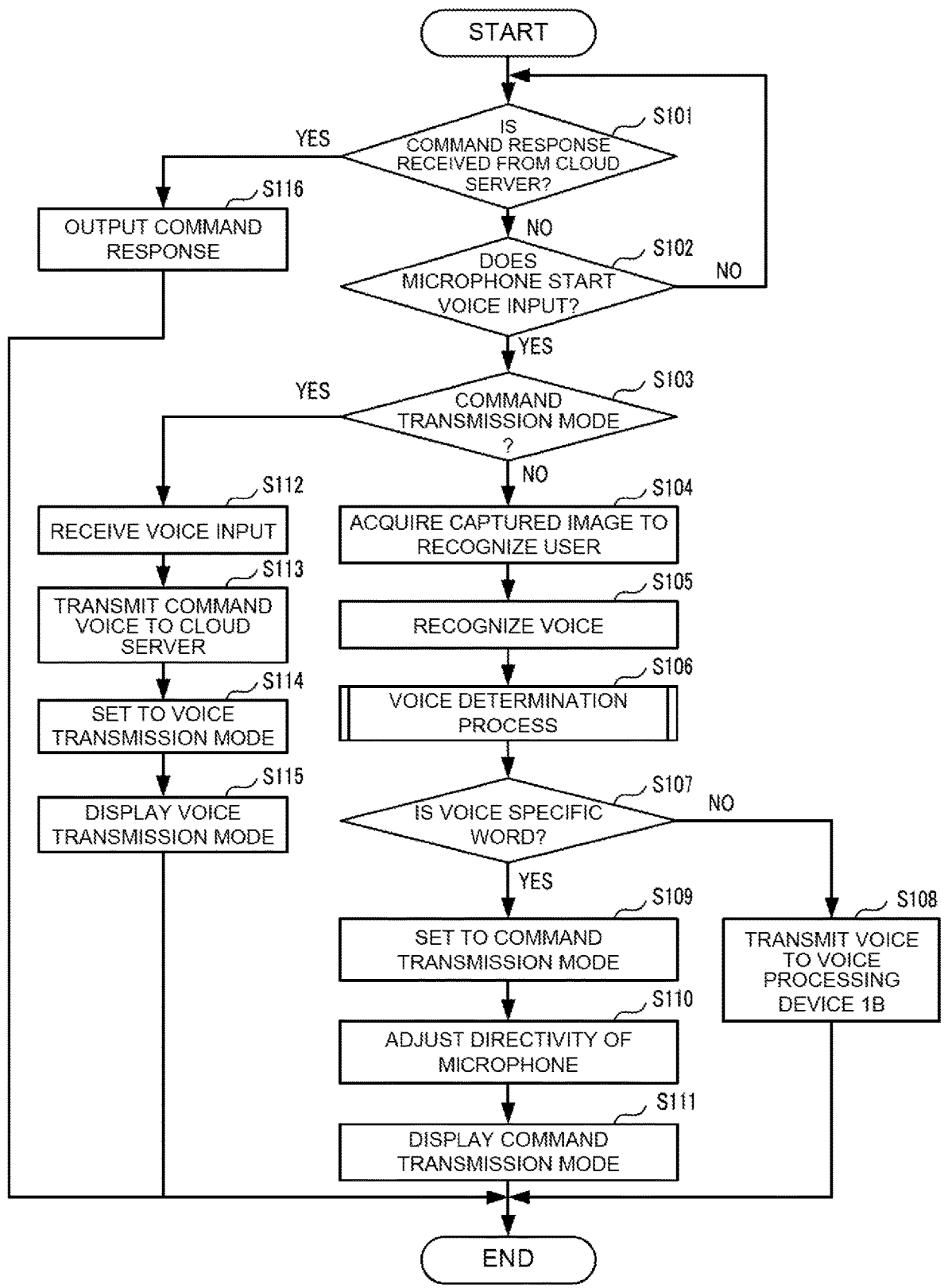
FIG. 4 is a flowchart for explaining an example of a procedure of voice processing in a voice processing device according to the embodiment of the present disclosure.

When the voice determination process ends, the controller 11 determines whether or not the voice is the specific word in step S107 illustrated in FIG. 4. If the voice is the specific word (S107: YES), the processing proceeds to step S109. On the other hand, if the voice is not the specific word (S107: NO), the processing proceeds to step S108.

In step S108, the controller 11 transmits the voice to the voice processing device 1B. Here, the voice is, for example, a voice of conversation with respect to an agenda of a meeting. After step S108, the voice processing ends.

In step S109, the controller 11 sets the transmission mode to the command transmission mode.

In step S110, the controller 11 adjusts the directivity of the microphone 14 into the direction of the utterer.

In step S111, the controller 11 displays information (LED) indicating the command transmission mode on the voice processing device 1A. After step S111, the voice processing ends.

Here, if the transmission mode is the command transmission mode in step S103 (S103: YES), the controller 11 receives a voice input in step S112. The voice here is a command voice.

Next, in step S113, the controller 11 transmits the command voice to the cloud server 2. Thus, the command voice is not transmitted to the voice processing device 1B, but is transmitted to the cloud server 2.

Next, in step S114, the controller 11 switches the transmission mode from the command transmission mode to the voice transmission mode.

Next, in step S115, the controller 11 displays information (LED) indicating the voice transmission mode on the voice processing device 1A. After step S115, the voice processing ends.

If the voice processing device 1A receives the command response from the cloud server 2 in step S101 (S101: YES), the controller 11 outputs the command response from the speaker 13 in step S116. After step S116, the voice processing ends. It is noted that the voice processing device 1A may be configured to continuously receive command voices. For example, if the command response includes information for permitting continuous reception, the controller 11 sets the transmission mode to the command transmission mode after step S116, and continuously receives a command voice from the user. In this case, the controller 11 continues to display information indicating the command transmission mode on the voice processing device 1A.

Thus, the voice processing is executed. As described above, if a voice uttered by a user is a specific word (activation word), the voice processing device 1 according to the embodiment of the present disclosure starts receiving a command, and transmits the received command voice to the cloud server 2. The voice processing device 1 does not also transmit the command voice to an external device such as another voice processing device 1. On the other hand, if the voice uttered by the user is not the specific word, the voice processing device 1 transmits the voice to the external device. In addition, even if the voice uttered by the user matches the specific word, the voice processing device 1, when determining that the voice is not uttered by the user to instruct execution of the command in the captured image of the user (e.g., when the face image is not facing the front), determines that the voice uttered by the user is not the specific word, and transmits the voice to the external device. This makes it possible to prevent execution of a command not intended by the user without interfering with a conversation of the user. Further, with the meeting system 100 according to the present embodiment, in a remote meeting, it is possible to transmit a voice of conversation appropriately to a remote place, and to execute a command intended by the user appropriately.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A voice processing device comprising:
voice receiving circuitry that receive a voice;
an imager;
image acquiring circuitry that acquire a captured image captured by the imager;
utterer identifying circuitry that identify an utterer based on the voice received by the voice receiving circuitry and the captured image acquired by the image acquiring circuitry;
voice determining circuitry that determine whether the voice is a specific word for starting receiving a predetermined command based on the voice received by the voice receiving circuitry and an image of the utterer identified by the utterer identifying circuitry, the image of the utterer being included in the captured image; and
voice transmitting circuitry that switch a transmission destination of the voice received by the voice receiving circuitry based on a determination result by the voice determining circuitry, wherein
the voice transmitting circuitry switch, based on the determination result by the voice determining circuitry, between a first transmission mode in which the voice received by the voice receiving circuitry is transmitted to a server device that executes the predetermined command and a second transmission mode in which the voice received by the voice receiving circuitry is transmitted to a predetermined external device, and
the voice processing device further includes adjustment process operating circuitry that adjust a directivity of a microphone that collects the voice, into a direction of the utterer identified by the utterer identifying circuitry if the second transmission mode is switched to the first transmission mode by the voice transmitting circuitry.

2. The voice processing device according to claim 1, wherein if the voice determining circuitry determine that the voice received by the voice receiving circuitry is the specific word, the voice transmitting circuitry transmit a voice received following the specific word by the voice receiving circuitry, as a command voice, to the server device that executes the predetermined command.

3. The voice processing device according to claim 2, further including response process operating circuitry that acquire a response corresponding to the command executed in the server device from the server device, and output the response.

4. The voice processing device according to claim 1, wherein if the voice determining circuitry determine that the voice received by the voice receiving circuitry is not the specific word, the voice transmitting circuitry transmit the voice to the predetermined external device.

5. The voice processing device according to claim 1, wherein if the voice received by the voice receiving circuitry matches the specific word and a direction of a face of the utterer or a line of sight of the utterer included in the captured image is directed to the imager, the voice determining circuitry determine that the voice received by the voice receiving circuitry is the specific word.

6. The voice processing device according to claim 1, further including display process operating circuitry that cause to display identification information indicating the first transmission mode or the second transmission mode.

7. A meeting system comprising a first voice processing device and a second voice processing device that are connected to each other via a network so that a voice received by the first voice processing device is transmitted to the second voice processing device and a voice received by the second voice processing device is transmitted to the first voice processing device, in which
the first voice processing device includes:
voice receiving circuitry that receive a voice;
an imager;
image acquiring circuitry that acquire a captured image captured by the imager;
utterer identifying circuitry that identify an utterer based on the voice received by the voice receiving circuitry and the captured image acquired by the image acquiring circuitry;
voice determining circuitry that determine whether the voice is a specific word for starting receiving a predetermined command based on the voice received by the voice receiving circuitry and an image of the utterer identified by the utterer identifying circuitry, the image of the utterer being included in the captured image; and
voice transmitting circuitry that switch a transmission destination of the voice received by the voice receiving circuitry based on a determination result by the voice determining circuitry, wherein
if the voice determining circuitry determine that the voice received by the voice receiving circuitry is the specific word, the voice transmitting circuitry transmit a voice received following the specific word by the voice receiving circuitry, as a command voice, to a server device that executes the predetermined command,
if the voice determining circuitry determine that the voice received by the voice receiving circuitry is not the specific word, the voice transmitting circuitry transmit the voice to the second voice processing device,
the voice transmitting circuitry switch, based on the determination result by the voice determining circuitry, between a first transmission mode in which the voice received by the voice receiving circuitry is transmitted to the server device that executes the predetermined command and a second transmission mode in which the voice received by the voice receiving circuitry is transmitted to a predetermined external device, and
the first voice processing device further includes adjustment process operating circuitry that adjust a directivity of a microphone that collects the voice, into a direction of the utterer identified by the utterer identifying circuitry if the second transmission mode is switched to the first transmission mode by the voice transmitting circuitry.

8. The meeting system according to claim 7, wherein the second voice processing device outputs the voice received from the first voice processing device.

9. A voice processing method, executed by one or more processors, comprising:
receiving a voice;
acquiring a captured image captured by an imager;
identifying an utterer based on the voice received at receiving the voice and the captured image acquired at acquiring the captured image;
determining whether the voice is a specific word for starting receiving a predetermined command based on the voice received at receiving the voice and an image of the utterer identified at identifying the utterer, the image of the utterer being included in the captured image; and
switching a transmission destination of the voice received at receiving the voice based on a determination result at determining whether the voice is the specific word,
switching the transmission destination, based on the determination result at determining whether the voice is the specific word, between a first transmission mode in which the voice received at receiving the voice is transmitted to a server device that executes the predetermined command and a second transmission mode in which the voice received at receiving the voice is transmitted to a predetermined external device, wherein
the voice processing method further includes adjusting a directivity of a microphone that collects the voice, into a direction of the utterer identified at identifying the utterer if the second transmission mode is switched to the first transmission mode at switching the transmission destination.

* * * * *